United States Patent
Wu et al.

(10) Patent No.: US 10,157,341 B2
(45) Date of Patent: Dec. 18, 2018

(54) RADIO-FREQUENCY FRONT-END CIRCUIT COMBINING RECTIFICATION AND LOAD MODULATION AND PASSIVE RADIO-FREQUENCY TAG

(71) Applicants: EXCELIO TECHNOLOGY (SHENZHEN) CO., LTD, Shenzhen (CN); WUXI EXCELIO TECHNOLOGY CO., LTD, Wuxi (CN)

(72) Inventors: Patrick Bian Wu, Shenzhen (CN); Fuqiang Han, Shenzhen (CN); Xingyi Wang, Shenzhen (CN)

(73) Assignees: EXCELIO TECHNOLOGY (SHENZHEN) CO., LTD., Shenzhen (CN); WUXI EXCELIO TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 15/789,404

(22) Filed: Oct. 20, 2017

(65) Prior Publication Data

US 2018/0089549 A1 Mar. 29, 2018

Related U.S. Application Data

(63) Continuation of application No. PCT/CN2016/079639, filed on Apr. 19, 2016.

(30) Foreign Application Priority Data

Apr. 20, 2015 (CN) .......................... 2015 1 0187888

(51) Int. Cl.
*G06K 19/07* (2006.01)

(52) U.S. Cl.
CPC ................................ *G06K 19/0723* (2013.01)

(58) Field of Classification Search
CPC .................................................. G06K 19/0723
USPC ......................................................... 235/492
See application file for complete search history.

(56) References Cited

U.S. PATENT DOCUMENTS

2017/0101075 A1* 4/2017 Kofler ................ G06K 19/0723
2017/0286820 A1* 10/2017 Nikunen ................ H04Q 9/00
2018/0032768 A1* 2/2018 Ganesan ............ G06K 19/0709

* cited by examiner

*Primary Examiner* — Paultep Savusdiphol
(74) *Attorney, Agent, or Firm* — Wayne & Ken, LLC; Tony Hom (57) ABSTRACT

The present invention discloses a radio-frequency (RF) front-end circuit combining functions of rectification and load modulation and a passive RF tag including thereof. The RF front-end circuit includes a first modulation unit arranged at an output of a rectifier circuit and a second modulation unit arranged between a first and a second end of an antenna coil. The first modulation unit and the second modulation unit are configured to change respectively the voltage at the output of the rectifier circuit and voltage at the two ends of the antenna coil by modulating under a strong field environment or a weak field environment, thus adjusting modulation depth of the passive RF tag. The RF front-end circuit also includes a unidirectional conducting unit to prevent loss of charges stored in a capacitor. The present invention solves existing contradiction of design specification requirements between cost and sensitivity of a passive RF tag.

9 Claims, 8 Drawing Sheets

RADIO-FREQUENCY FRONT-END CIRCUIT COMBINING RECTIFICATION AND LOAD MODULATION AND PASSIVE RADIO-FREQUENCY TAG

TECHNICAL FIELD

The present invention belongs to the technical field of radio-frequency identification, and particularly relates to a passive radio-frequency tag front-end circuit combining functions of rectification and load modulation, and a passive radio-frequency tag including the front-end circuit.

BACKGROUND

A radio-frequency identification (RFID) tag itself does not have a battery and works relying on electromagnetic energy transmitted by a card reader. Owing to its simple structure, being economical and practical, RFID tags have been widely applied in the fields of logistic management, asset tracking, mobile health care and the like.

A radio-frequency front-end circuit of a passive RFID tag has two input ends which are respectively connected with two ends of an external inductance antenna coil that are also port-shared by a receiving end of the RFID tag that receives a downlink signal transmitted by the card reader and energy of a radio-frequency field, and a transmitting end of the RFID tag that outwardly transmits feedback uplink data signal to the card reader. Firstly, a passive RFID tag works by absorbing electromagnetic energy transmitted by the card reader from surrounding environment. After absorbing energy, the passive RFID tag rectifies a portion of energy into a DC power supply for a passive RFID tag's load circuit. Secondly, during an uplink communication process of transmitting data information from the RFID tag to the card reader, the passive RFID tag takes the form of load modulation, that is, controlling and changing the port impedance of a RF front-end by virtue of data information to be transmitted; the change of the port impedance leads to change of the current flowing in the inductance antenna coil of the passive RFID tag. A voltage waveform across both ends of the inductance antenna coil exhibits an amplitude modulated wave whose envelop magnitude changes according to the data being transmitted. Carrier frequency of the amplitude modulated wave is consistent with the carrier frequency of the RF field initiatively transmitted by the card reader, and the envelop magnitude of the amplitude modulated wave is related to the change of the port impedance, i.e., the envelop magnitude of the amplitude modulated wave is related to the data being transmitted. This amplitude modulated wave leads to change of the magnetic field induced by the inductance antenna coil. The change of the magnetic field is used as feedback data and received by the inductance antenna coil of the card reader through coupling effect of magnetic field, thereby completing the uplink data communication task.

Passive RF tag design is challenging in many aspects. A first challenge is to apply low-power circuit techniques to achieve complex functions of data transmission so as to satisfy battery-free design requirements. A second challenge is to apply low-cost design techniques to achieve as small as possible chip area so as to make package size small for high commercial profit. For example, an energy-storage capacitor is unavoidably necessary for a passive RF tag. The size of the energy-storage capacitor determines the available electrical energy in the circuit and is also a critical parameter that directly determines the circuit performance. In a modern deep sub-micron integrated manufacturing process, the size of capacitor is directly proportional to its occupied chip area without exception: the larger the chip area, the greater the energy-storage capacitor value, and the better the circuit performance. More importantly, a critical performance specification of a passive RF tag is its communication sensitivity, i.e. the maximum distance for the tag to perform reliable communication and various read-write operations; and the higher the sensitivity, the longer the distance, and the better the performance of the RF tag.

To tackle the above mentioned first challenge, a suitable technique is low-power system design on all aspects, including the design of system architecture, application of integrated circuit manufacture process that offers suitable integrated devices, exquisite design of circuit modules, optimization of physical layouts and the like. This is a wide and profound subject and is beyond scope of the present invention.

To tackle the above mentioned second challenge, it is essential to alleviate dependence of the prior art on a great number of energy-storage capacitors. The energy-storage capacitors are generally connected to an output of a low drop-out (LDO) voltage regulator circuit, which connects to the rectifier output. The circuit's switching among various modes, as well as modulating and demodulating digital commands cause instantaneous voltage pull-down fluctuation to various extents, i.e., abrupt change of the power supply voltage at the output of the LDO voltage regulator. A typical low-power LDO voltage regulator cannot sufficiently suppress these pull-down fluctuation through its internal error-correcting feedback loop. An only viable option is to increase the energy-storage capacitor connected with the output. Thus, the pull-down fluctuation problem is mitigated by transporting charges stored by the capacitor; and the larger the capacitor, the better the effect of suppression.

Figure 1:
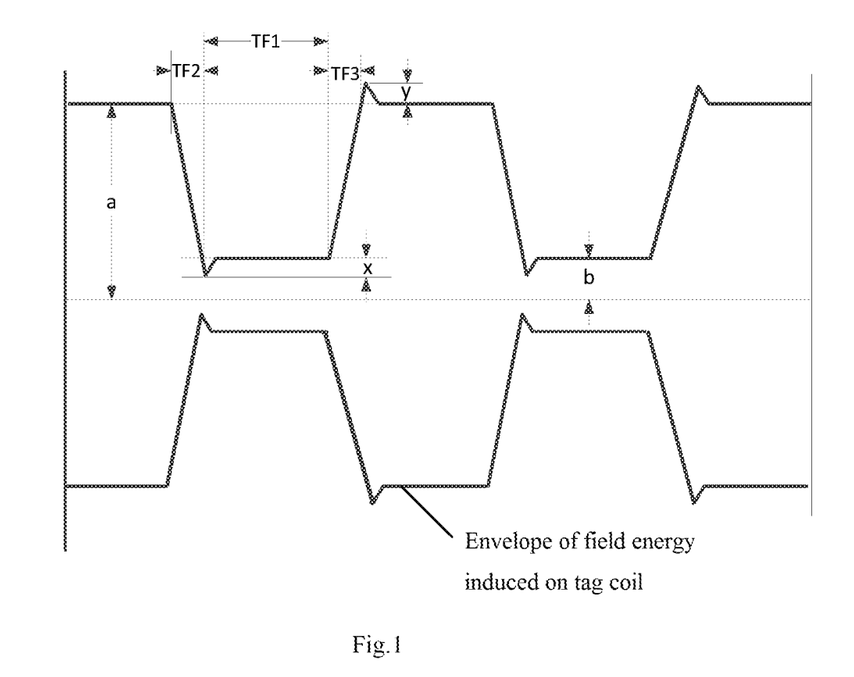
FIG. 1 is a diagram illustrating an envelope of field energy induced on a passive radio-frequency tag's antenna coil ends.

To cope with the above mentioned third challenge to improve communication sensitivity, the size of on-chip energy-storage capacitor is also much of concerned. The larger the energy-storage capacitor, the more the energy collected under the same distance condition, thus, the higher the sensitivity. Besides on-chip energy-storage capacitor, the factors directly related to sensitivity, or communication distance, are lies in the technology to realize the aforementioned load modulation. Load modulation changes the equivalent load impedance across the two ends of the antenna coil so as to change the current flowing the antenna coil and to further change the magnetic field generated by the current. The varying magnetic field is coupled to the antenna coil of a card reader, thereby completing the data transmission process. However, there is a limit of demodulation capability of the card reader. Due to the limited demodulation capability, only if the variation of the magnetic field be larger than a minimum amount can it be accurately demodulated at the card reader. Under constant coupling conditions, i.e., when communication distance is constant, variation of the magnetic field is determined by modulation depth on the RF tag's antenna coil. The modulation depth determines whether the card reader can accurately demodulate data signal. The greater the modulation depth, the easier the demodulation by the card reader, the longer the communication distance, and thus, the higher the sensitivity. The demodulation depth is generally defined as FIG. 1 in the industry. As an example, the value of each parameter of an amplitude modulated wave shown in FIG. 1 is shown in the following table.

| Parameter symbol | Minimum | Maximum |
| --- | --- | --- |
| m = (a − b)/(a + b) | 90% | 100% |
| TF1 | 4 * Tc | 10 * Tc |
| TF2 | 0 | 0.5 * TF1 |
| TF3 | 0 | 0.5 * TFd0 |
| X | 0 | 0.05 * a |
| Y | 0 | 0.05 * a |

However, the modulation depth of the voltage on an RF tag's antenna coil decreases along with increase of energy of RF field. When the card reader is close to the RF tag, the passive RF tag is located in the strong RF field generated by the card reader. In this strong field environment, for reliability reasons of preventing internal devices of the RF tag from being broken down by excessively high voltage, peak value of the voltage amplitude is generally limited by an amplitude-limiting circuit. In this situation, due to the strong field, the wave trough is much higher than that in a weak field, and this crest-trough combination has resulted in insufficient modulation depth under the near and strong field condition. Because of this, a lot of low-cost card readers with a limited demodulation capability in the market cannot accurately demodulate uplink data transmitted by a RF tag. This is one of main reasons causing a communication response dead zone of an RF tag under near field condition which is frequently encountered in practice.

Figure 2:
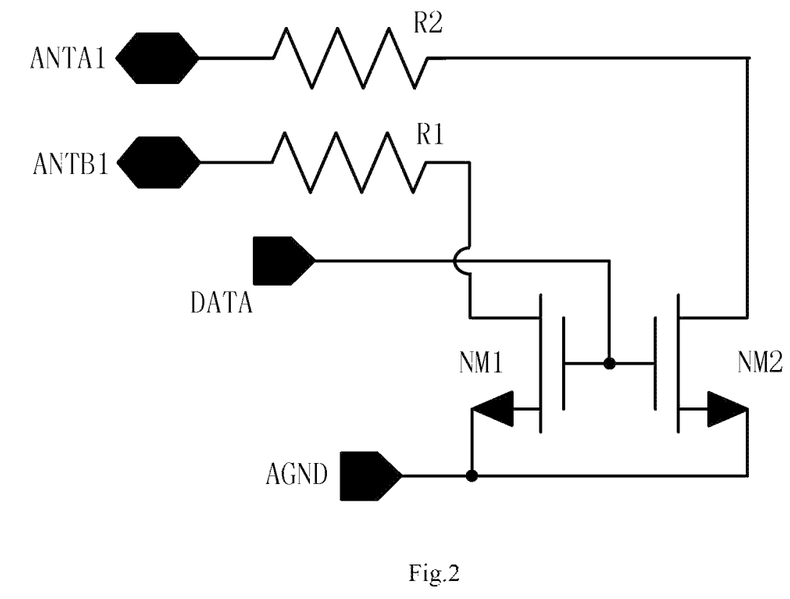
FIG. 2 is a structural diagram of a load modulation circuit of an existing passive radio-frequency tag.

In prior arts a pull-down resistor is adopted to realize load modulation as shown in FIG. 2, i.e., a resistor with a constant resistance value is connected across the two ends of the RF tag's antenna coil after being serially connected with a switch device, wherein turning on and off of the switch device depends on the polarity of the data to be transmitted. For example, when the datum is "0", the switch is turned on, and the pull-down resistor is connected across the two ends of the antenna coil to form a structure where the pull-down resistor is connected in parallel to the RF tag's equivalent impedance seen across the two ends of the antenna coil, thereby decreasing the coil impedance. Conversely, when the datum is "1", the switch is turned off and the pull-down resistor does not influence the equivalent impedance seen across the two ends of the antenna coil. In order to make the pull-down more effective and to increase the demodulation depth, the resistance value of the pull-down resistor is expected to be smaller, but the excessively low trough under the weak field condition cannot meet the energy collection requirement. On the other hand, if the resistance value of the pull-down resistor is excessively large, pull-down under strong field condition will not be much effective, which leads to insufficient demodulation depth. Therefore, the value of the pull-down resistor for the load modulation in the prior art cannot give consideration to the performance requirements both under the strong field and the weak field conditions, and the RF tag cannot meet the market demands of high performance and low cost.

Figure 3:
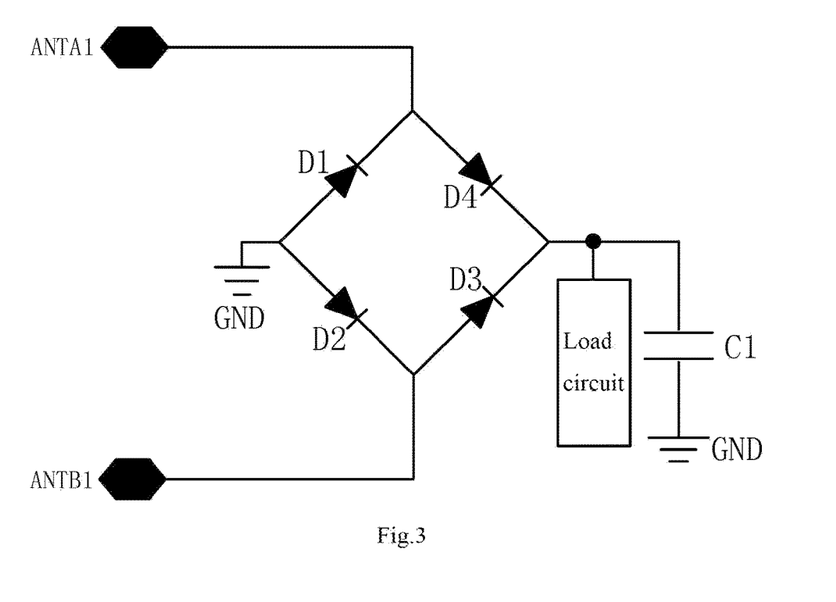
FIG. 3 is a structural diagram of a circuit of the existing passive radio-frequency tag.

On the other hand, when an RF tag is far from a card reader, it is located in a weak field environment. Under such condition, the trough may decrease to a relatively low level, thereby making energy collection difficult. Because the oscillation amplitude on the antenna coil may be smaller than the sum of threshold voltages of all unidirectional conducting devices in the rectifier circuit during a wave-trough period of the RF signal's amplitude envelop, the rectifier stops working, and energy collection also stops, and the RF tag is only powered by the charges stored on the energy-storage capacitor. In the existing passive RF tag circuit structure shown in FIG. 3, in the period of wave-crest, the energy-storage capacitor is charged by virtue of the charges output by the rectifier, which also increase the voltage of the energy-storage capacitor and relevant nodes surrounding the energy-storage capacitor; and in the period of wave-trough, the voltages of the antenna coil ports may be lower than the voltage of the energy-storage capacitor and the relevant nodes surrounding the energy-storage capacitor. Under such condition, voltage of a substrate node of the unidirectional conducting unit in the rectifier circuit normally formed by an MOS device, if connected in the way that prior art normally does, may be higher than voltage of its source diffusion and its drain diffusion zone, thereby forming a forward conducting path. The charges on the energy-storage capacitor C1 may flow towards the antenna coil's port in accordance with the forward conducting current causing a loss of the energy-storage charges. Such a periodic loss influences the overall energy collection efficiency, so that the load circuit cannot work properly due to excessively low power supply voltage of the circuit and the RF tag has no response at the far end, i.e., the sensitivity of the tag is decreased.

In a pulse width modulated RF carrier signal, width of a wave-crest and a wave-trough of the signal envelop, i.e., the number of pulse periods of the carrier signal represents digit "1" or "0" to be transmitted (the polarity of the signals corresponding to the wave-crest and wave-trough is different if stipulated differently, which is not described in detail herein). For a transmission protocol with a low transmission rate, the wave-trough width may be greater than that of the transmission protocol with the higher transmission rate. Moreover, when the digital information (such as consecutive "0" digits) represented by a plurality of wave-trough pulse width signals is continuously transmitted, the wave-trough width may be very large, and the energy collection then faces great challenge.

Therefore, the application of energy-storage capacitor on passive RF tags directly determines two crucial performance parameters, namely cost and sensitivity of the passive RF tag. How to more efficiently utilize the energy-storage capacitor to maximize the sensitivity of an RF tag with a limited number of energy-storage capacitors becomes a focused research subject of the field.

SUMMARY

In view of existing contradiction of design specification requirements between performance and cost of a passive RF tag product, the present invention aims at providing a RF front-end circuit combining functions of rectification and load modulation to solve the major problems associated with the RF tag front-end circuit. Firstly, modulation depth when an RF front-end circuit transmits data can be effectively and precisely controlled so as to improve the communication sensitivity of the RF tag; and secondly, efficiency of energy collection of a rectifier in an RF front-end circuit can be increased in order to maximally reduce the RF tag's demand on energy storage capacitors, thus meeting low-cost design requirements.

In order to achieve the above objectives, the present invention adopts a technical solution as follows: a radio-frequency front-end circuit of a radio-frequency tag combining functions of rectification and load modulation includes a rectifier circuit, wherein a first and a second input of the rectifier circuit is respectively connected to a first and a second end of an antenna coil, an output thereof to an input of a load circuit and a positive end of an energy-storage capacitor, and a negative end of the energy-storage capacitor is grounded.

A first modulation unit is connected between the output of the rectifier circuit and the ground; and the first modulation unit is configured to, when the radio-frequency tag is in a strong field environment, change voltage of the output of the rectifier circuit by utilizing data to be transmitted as a logic control signal to short-circuit or open-circuit a second threshold unit, so that the radio-frequency tag has a sufficient modulation depth, thereby making it easier for a receiving card reader to demodulate uplink data information transmitted by the radio-frequency tag.

A second modulation unit is connected between the first antenna end and the second antenna end; and the second modulation unit is configured to, when the radio-frequency tag is in a weak field environment, change voltage across the two ends of the antenna coil of the transmitting radio-frequency tag by utilizing data to be transmitted as the logic control signal to connect or disconnect a pull-down resistor, so that the radio-frequency tag has a sufficient modulation depth, thereby making it easier for the receiving card reader to demodulate uplink data information transmitted by the radio-frequency tag.

A unidirectional conducting unit is connected between the output of the rectifier circuit and the input of the load circuit, which is also the positive end of the energy-storage capacitor; an input of the unidirectional conducting unit is connected to the output of the rectifier circuit; an output of the unidirectional conducting unit is connected to the input of the load circuit and the positive end of the energy-storage capacitor; and a first control end and a second control end of the unidirectional conducting unit are respectively connected to the output of the unidirectional conducting unit, thus forming a unidirectional path from the rectifier circuit to the load circuit and the energy-storage capacitor so as to prevent current of the energy-storage capacitor from flowing back to the rectifier circuit and the antenna coil's port.

A further technical feature of the present invention according to the above structure lies in that the first modulation unit includes a first threshold unit, a second threshold unit, a second N-type MOS transistor and a seventh N-type MOS transistor which are connected in series.

An input of the first threshold unit is connected to the output of the rectifier circuit; an output of the first threshold unit is connected to an input of the second threshold unit; an output of the second threshold unit is connected to a drain end of the seventh N-type MOS transistor; a source end of the seventh N-type MOS transistor is grounded; a gate end of the seventh N-type MOS transistor is connected to a first enabling signal end; a drain end of the second N-type MOS transistor is connected to the input of the second threshold unit; a source end of the second N-type MOS transistor is connected to the output of the second threshold unit; and a gate end of the second N-type MOS transistor is connected to a digital signal output end.

A further technical feature of the present invention according to the above structure lies in that the second modulation unit comprises a third resistor, a fourth resistor, and a third N-type MOS transistor, a fourth N-type MOS transistor, a fifth N-type MOS transistor and a sixth N-type MOS transistor.

An input of the third resistor is connected to the first end of the antenna coil; the output of the third resistor is connected to a drain end of the third N-type MOS transistor; a source end of the third N-type MOS transistor is connected to a drain end of the fourth N-type MOS transistor; a source end of the fourth N-type MOS transistor is grounded; a gate end of the third N-type MOS transistor is connected to the digital signal output end; and a gate end of the fourth N-type MOS transistor is connected to a second enabling signal end.

An input of the fourth resistor is connected to the second end of the antenna coil; the output of the fourth resistor is connected to a drain end of the fifth N-type MOS transistor; a source end of the fifth N-type MOS transistor is connected to a drain end of the sixth N-type MOS transistor; a source end of the sixth N-type MOS transistor is grounded; a gate end of the fifth N-type MOS transistor is connected to the digital signal output end; and a gate end of the sixth N-type MOS transistor is connected to the second enabling signal end.

Further, the unidirectional conducting unit is a P-type MOS transistor; a source end of the P-type MOS transistor is connected to the output of the rectifier circuit as the input of the unidirectional conducting unit; a drain end of the P-type MOS transistor is connected to the input of the load circuit and the positive end of the energy-storage capacitor as the output of the unidirectional conducting unit; a gate end of the P-type MOS transistor is connected to the drain end of itself; and a substrate end of the P-type MOS transistor is connected to the drain end of itself.

Alternatively, the unidirectional conducting unit is an N-type MOS transistor; a drain end of the N-type MOS transistor is connected to the output of the rectifier circuit as the input of the unidirectional conducting unit; a source end of the N-type MOS transistor is connected to the input of the load circuit and the positive end of the energy-storage capacitor as the output of the unidirectional conducting unit; the gate end of the N-type MOS transistor is connected to the drain end of itself; and a substrate end of the N-type MOS transistor is connected to the drain of itself.

Another objective of embodiments of the present invention is to provide a passive radio-frequency tag including the radio-frequency front-end circuit combining functions of rectification and load modulation.

According to the radio-frequency front-end circuit combining the functions of rectification and load modulation and the passive radio-frequency tag, an output of a rectifier circuit is provided with a first modulation unit; a second modulation unit is arranged between a first and a second end of an antenna coil; and the first modulation unit and the second modulation unit are respectively modulated to change voltage at the output of the rectifier circuit or the two ends of the antenna coil of a radio-frequency tag's transmitting end when it is in a strong field environment and a weak field environment, thereby adjusting modulation depth of the radio-frequency tag, and making it easier for a receiving card reader to demodulate uplink data information transmitted by the radio-frequency tag, i.e., improving sensitivity of the radio-frequency tag. Meanwhile, a unidirectional conducting unit connected between the output of the rectifier circuit and the input of a load circuit, which is also a positive end of an energy-storage capacitor, can switch in and input the rectified current to the load circuit and the energy-storage capacitor when the energy of the radio-frequency field is in a wave-crest period so as to power the load circuit and to enable the energy-storage capacitor to store electric charges, and the energy-storage capacitor outputs charges when the energy of the radio-frequency field is in the period of wave-trough; and since the unidirectional conducting unit is in a strict reverse bias state, the charges cannot reversely flow to the rectifier circuit and the antenna coil's port, so that loss of the energy-storage charges can be avoided, and the charges can only be input to the load circuit to be used for the load circuit to work, thereby increasing the utilization rate of the energy-storage charges of the energy-storage capacitor, and reducing the number of the energy-storage capacitors, and reducing area of the tag chip, and achieving an objective of decreasing the cost. The present invention effectively solves the existing contradictory problem of the cost and sensitivity of passive radio-frequency tags, so as to meet the market demands on low cost and high performance.

DETAILED DESCRIPTION

The technical solution in embodiments of the present invention is clearly and completely described below in conjunction with the drawings in embodiments of the present invention. Apparently, the described embodiments are only some rather than all embodiments of the present invention. All other embodiments obtained on the basis of the embodiments in the present invention by those ordinary skilled in the art without exerting innovative effort shall fall within the protection scope of the present invention.

Figure 4:
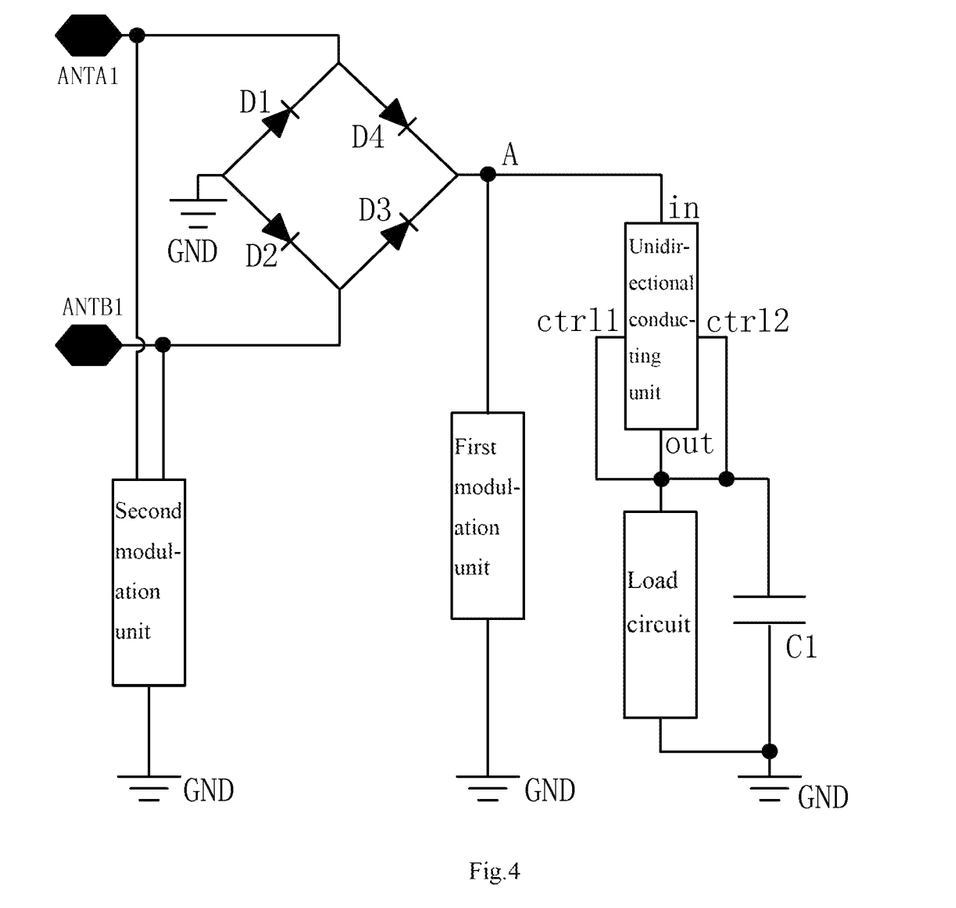
FIG. 4 is a structural block diagram of a circuit of a passive radio-frequency tag of the present invention.

FIG. 4 shows a structural block diagram of a circuit of a passive radio-frequency tag of the present invention. A radio-frequency front-end circuit combining functions of rectification and load modulation includes a rectifier circuit. A first and a second input of the rectifier circuit is respectively connected to a first antenna coil end ANTA1 and a second antenna coil end ANTB1, an output of the rectifier circuit is connected to an input of a load circuit and a positive end of an energy-storage capacitor C1, and a negative end of the energy-storage capacitor C1 is grounded.

A first modulation unit is connected between the output of the rectifier circuit and ground. The first modulation unit is configured to, when a radio-frequency tag is in a strong field environment, change voltage of the output of the rectifier circuit by utilizing data to be transmitted as a logic control signal to short-circuit or open-circuit a second threshold unit, so that the radio-frequency tag has a sufficient modulation depth, thereby making it easier for a receiving card reader to demodulate uplink data information transmitted by the radio-frequency tag.

A second modulation unit is connected between the first and the second end of the antenna coil. The second modulation unit is configured to, when the radio-frequency tag is in a weak field environment, change voltage across the two ends of an antenna coil of the radio-frequency tag's transmitting end by utilizing data to be transmitted as the logic control signal to connect or disconnect a pull-down resistor, so that the radio-frequency tag has a sufficient modulation depth, thereby making it easier for the receiving card reader to demodulate uplink data information transmitted by the radio-frequency tag.

A unidirectional conducting unit is further connected between the output of the rectifier circuit and the input of the load circuit, which is also the positive end of the energy-storage capacitor C1; the input of the unidirectional conducting unit is connected to the output of the rectifier circuit; the output of the unidirectional conducting unit is connected to the input of the load circuit and the positive end of the energy-storage capacitor C1. A first control end ctr11 and a second control end ctr12 of the unidirectional conducting unit are respectively connected to the output of the unidirectional conducting unit, and such a structure makes the unidirectional conducting unit a unidirectional conducting switch from an output of the rectifier circuit to the load circuit and the energy-storage capacitor C1.

According to the radio-frequency front-end circuit combining the functions of rectification and load modulation and the passive radio-frequency tag in the present invention, a first modulation unit is arranged at an output of a rectifier circuit; a second modulation unit is arranged between a first and a second end of an antenna coil; the first modulation unit and the second modulation unit change, by performing modulation, voltage at the output of the rectifier circuit and voltage across the two ends of an antenna coil of a radio-frequency tag's transmitting end respectively when it is in a strong field environment and a weak field environment, thereby adjusting its modulation depth, and making it easier for a receiving card reader to demodulate uplink data information transmitted by the radio-frequency tag, i.e., improving sensitivity of the passive radio-frequency tag. Meanwhile, the unidirectional conducting unit connected between the output of the rectifier circuit and the input of a load circuit, which is also a positive end of an energy-storage capacitor, can input the rectified current to the load circuit and the energy-storage capacitor when the energy of the radio-frequency field is in a wave-crest period so as to power the load circuit and to enable the energy-storage capacitor to store electric charges, and the energy-storage capacitor discharges when the energy of the radio-frequency field is in a wave-trough period. Since the unidirectional conducting unit is in a strict reverse bias state, electrical charges cannot reversely flow to the rectifier circuit and the antenna coil's port, so that loss of energy-storage charges can be avoided, and the charges can only be input to the load circuit for the load circuit to work, thereby increasing utilization rate of the energy-storage charges of the energy-storage capacitor, and reducing the number of energy-storage capacitors to be used, and reducing area of the tag chip, and decreasing cost of the chip. The present invention effectively solves existing contradiction of design specification requirements between cost and sensitivity of passive radio-frequency tags so as to meet the market demands on low cost and high performance.

Figure 5:
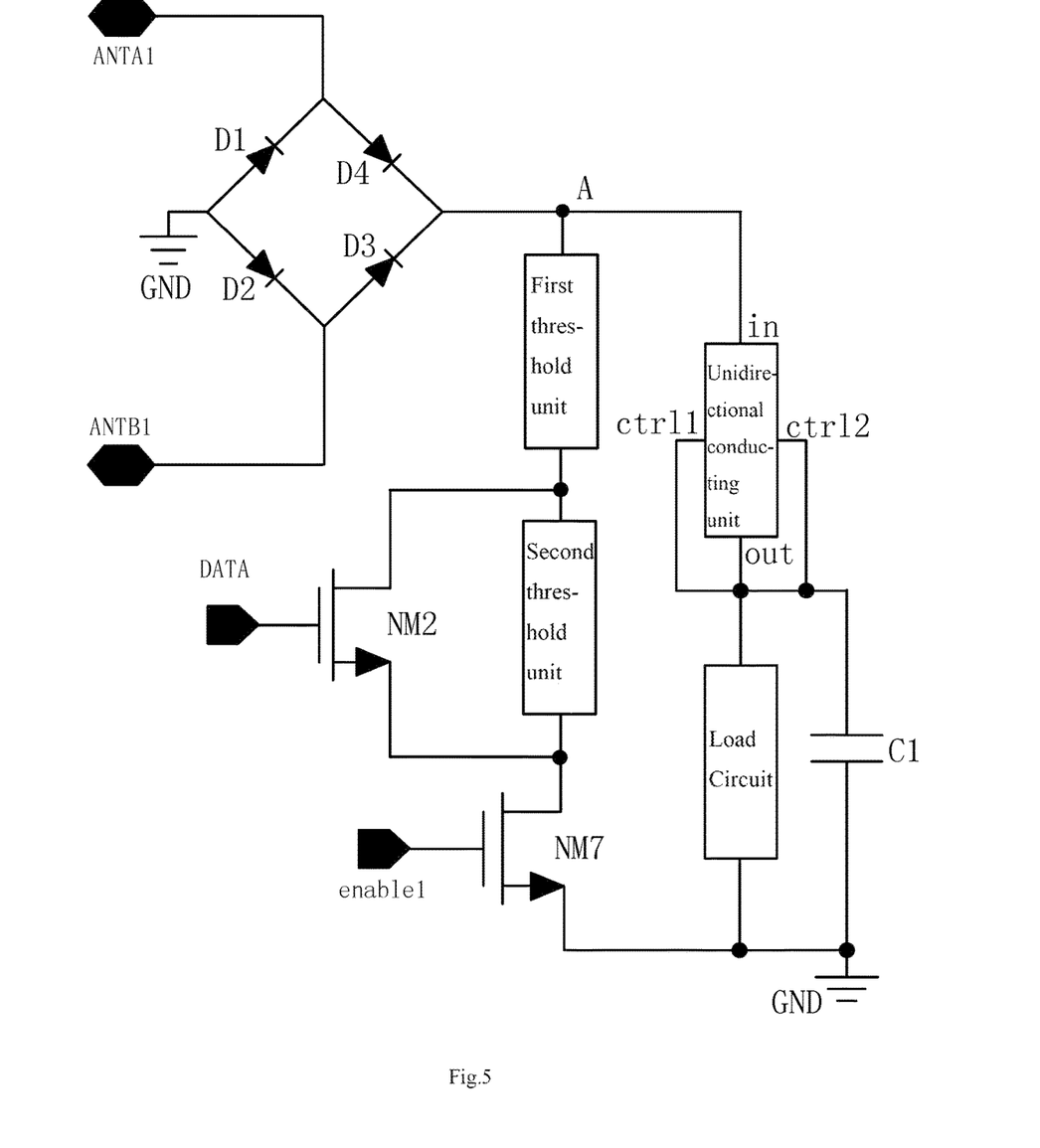
FIG. 5 is a structural diagram of a circuit of a first modulation unit of the present invention.

FIG. 5 is a structural diagram of a circuit of the first modulation unit of the present invention. The first modulation unit includes a first threshold unit, a second threshold unit, a second N-type MOS transistor NM2 and a seventh N-type MOS transistor NM7 which are connected in series.

An input of the first threshold unit is connected to an output of the rectifier circuit; an output of the first threshold unit is connected to an input of the second threshold unit; an output of the second threshold unit is connected to a drain end of the seventh N-type MOS transistor NM7; a source end of the seventh N-type MOS transistor NM7 is grounded; a gate end of the seventh N-type MOS transistor NM7 is connected with a first enabling signal end enable1; a drain end of the second N-type MOS transistor NM2 is connected to the input of the second threshold unit; a source end of the second N-type MOS transistor NM2 is connected to the output of the second threshold unit; and the gate end of the second N-type MOS transistor NM2 is connected to a digital signal output end DATA.

The first threshold unit is at least one diode, at least one P-type MOS transistor, or at least one N-type MOS transistor.

A cathode end of any one of the at least one diode is connected with an anode end of an adjacent diode to form a serial structure; the anode end of the first diode in the serial structure is connected to the output of the rectifier circuit as the input of the first threshold unit; and the cathode end of the last diode in the serial structure is connected to the input of the second threshold unit as the output of the first threshold unit.

A drain end of any one of the at least one P-type MOS transistor is connected with a source end of the adjacent P-type MOS transistor to form a serial structure; a gate end of each P-type MOS transistor is connected to a drain end thereof; the source end of the first P-type MOS transistor in the serial structure is connected to the output of the rectifier circuit as the input of the first threshold unit; and the drain end of the last P-type MOS transistor in the serial structure is connected to the input of the second threshold unit as the output of the first threshold unit.

A source end of any one of the at least one N-type MOS transistor is connected with a drain end of an adjacent N-type MOS transistor to form a serial structure; a gate end of each N-type MOS transistor is connected to a drain end thereof; the drain end of the first N-type MOS transistor in the serial structure is connected to the output of the rectifier circuit as the input of the first threshold unit; and the source end of the last N-type MOS transistor in the serial structure is connected to the input of the second threshold unit as the output of the first threshold unit.

Figure 6:
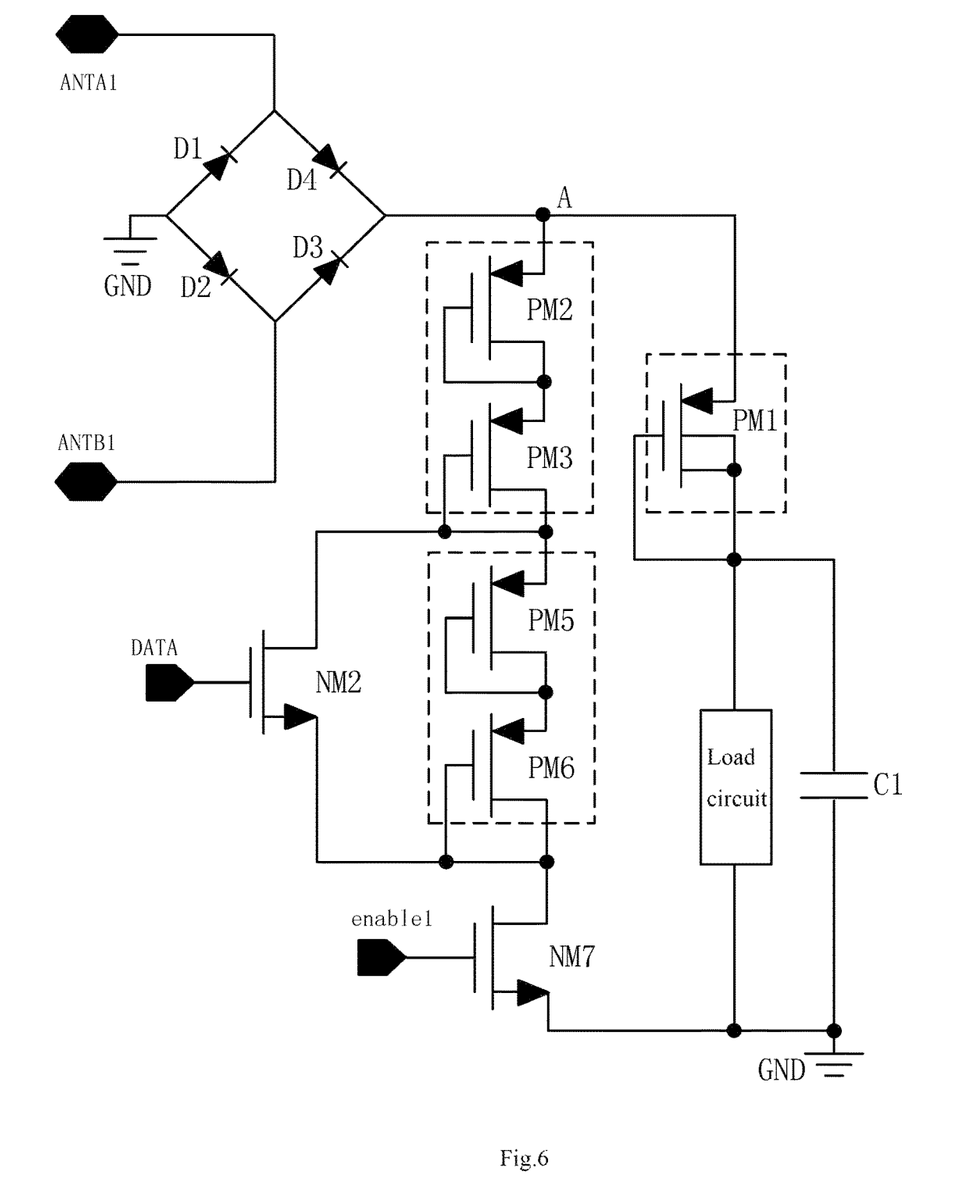
FIG. 6 is a circuit diagram of a first embodiment of a first modulation unit and a unidirectional conducting unit of the present invention.

The first threshold unit of the present embodiment is exemplified by two serially-connected P-type MOS transistors. As shown in FIG. 6, the source end of the second P-type MOS transistor PM2 is connected to the output of the rectifier circuit as the input of the first threshold unit; the gate end of the second P-type MOS transistor PM2 is connected to the drain end of itself and also connected to the source end of the third P-type MOS transistor PM3; and the gate of the third P-type MOS transistor PM3 is connected to the drain of itself and also connected to the input of the second threshold unit as the output of the first threshold unit.

The second threshold unit is at least one diode, or at least one P-type MOS transistor, or at least one N-type MOS transistor.

A cathode end of any one of the at least one diode is connected to an anode end of an adjacent diode to form a serial structure; the anode end of the first diode in the serial structure is connected to the output of the first threshold unit as the input of the second threshold unit; and the cathode end of the last diode in the serial structure is connected to the drain end of the seventh N-type MOS transistor as an output of the second threshold unit.

A drain end of any one of the at least one P-type MOS transistor is connected to a source end of an adjacent P-type MOS transistor to form a serial structure; a gate end of each P-type MOS transistor is connected to a drain end of itself; the source of the first P-type MOS transistor in the serial structure is connected to the output of the first threshold unit as the input of the second threshold unit; and the drain end of the last P-type MOS transistor in the serial structure is connected to the drain end of the seventh N-type MOS transistor as the output of the second threshold unit.

A source end of any one of the at least one N-type MOS transistor is connected to a drain end of an adjacent N-type MOS transistor to form a serial structure; a gate end of each N-type MOS transistor is connected to a drain of itself; the drain end of the first N-type MOS transistor in the serial structure is connected to the output of the first threshold unit as the input of the second threshold unit; and the source end of the last N-type MOS transistor in the serial structure is connected to the drain end of the seventh N-type MOS transistor as the output of the second threshold unit.

The second threshold unit of the present embodiment is exemplified by two serially-connected P-type MOS transistors. As shown in FIG. 6, the source of the fifth P-type MOS transistor PM5 is connected to the output of the first threshold unit as input of the second threshold unit; the gate end of the fifth P-type MOS transistor PM5 is connected to the drain end of itself and is also connected to the source end of the sixth P-type MOS transistor PM6; and the gate end of the sixth P-type MOS transistor PM6 is connected to the drain end of itself and is also connected to the drain end of the seventh N-type MOS transistor NM7 as the output of the first threshold unit.

Figure 7:
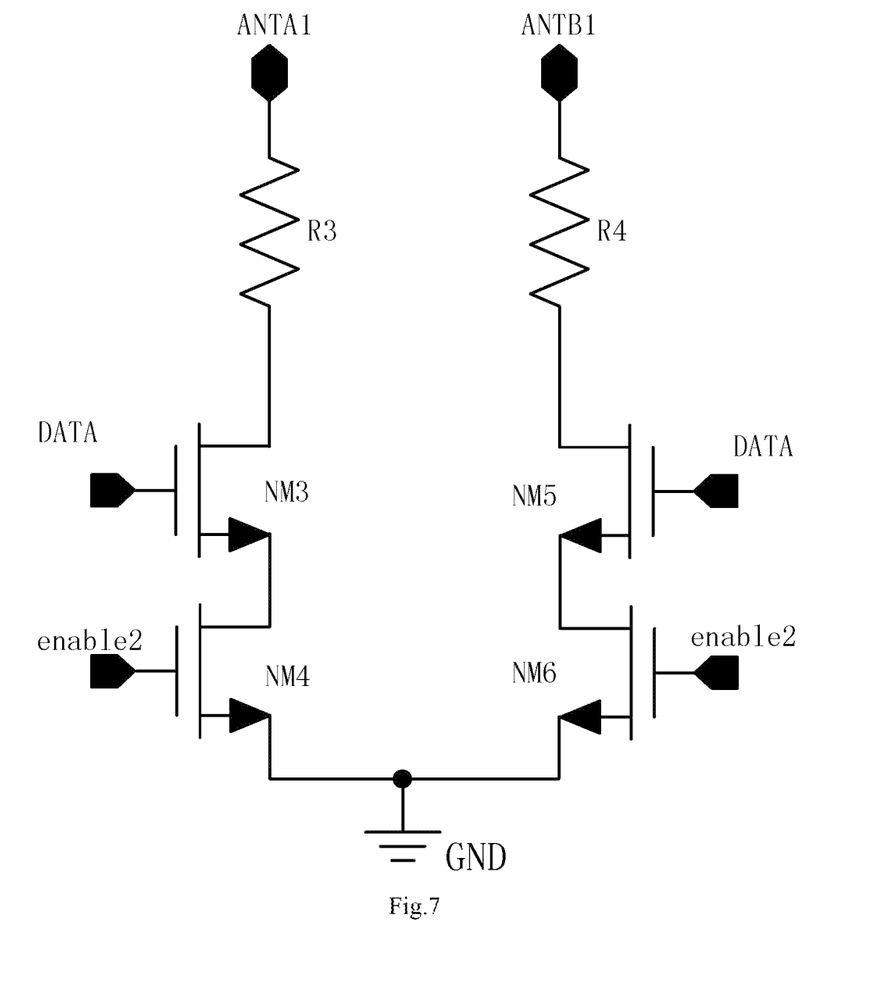
FIG. 7 is a structural diagram of a circuit of a second modulation unit of the present invention.

FIG. 7 shows a structural diagram of a circuit of the second modulation unit of the present invention. The second modulation unit includes a third resistor R3, a fourth resistor R4, a third N-type MOS transistor NM3, a fourth N-type MOS transistor NM4, a fifth N-type MOS transistor NM5 and a sixth N-type MOS transistor NM6.

The input of the third resistor R3 is connected to the first antenna coil end ANTA1; the output the third resistor R3 is connected to the drain end of the third N-type MOS transistor NM3; the source end of the third N-type MOS transistor NM3 is connected to the drain end of the fourth N-type MOS transistor NM4; the source end of the fourth N-type MOS transistor NM4 is grounded; the gate end of the third N-type MOS transistor NM3 is connected to the digital signal output end DATA; and the gate end of the fourth N-type MOS transistor NM4 is connected to a second enabling signal end enable2.

The input of the fourth resistor R4 is connected to the second antenna coil end ANTB1; the output of the fourth resistor R4 is connected to the drain end of the fifth N-type MOS transistor NM5; the source end of the fifth N-type MOS transistor NM5 is connected to the drain end of the sixth N-type MOS transistor NM6; the source end of the sixth N-type MOS transistor NM6 is grounded; the gate end of the fifth N-type MOS transistor NM5 is connected to the digital signal output end DATA; and the gate end of the sixth N-type MOS transistor NM6 is connected to the second enabling signal end enable2.

The first modulation unit and the second modulation unit of the present invention can modulate uplink data information transmitted by the radio-frequency tag alternately when the tag is in a strong field environment and a weak field environment so as to increase the modulation depth of the uplink data information and to make it easier for the receiving card reader to demodulate the uplink data information transmitted by the radio-frequency tag, i.e., improving sensitivity of the passive radio-frequency tag. The specific working principle of the first modulation unit and the second modulation unit is as follows:

When a passive radio-frequency tag is in a strong field environment, voltage at the output of the rectifier circuit (denoted as point A) is relatively high. During modulation, in order to pull down the voltage of the point A so that the two ends of the antenna coil of the radio-frequency tag have a significant modulation depth, the digital signal output end DATA controls the second N-type MOS transistor NM2 making it short-circuited, so that the second threshold unit is short-circuited. Meanwhile, the first enabling signal end enable1 controls the seventh N-type MOS transistor NM7 making it short-circuited, and thus only the first threshold unit in the first modulation unit is effective in the circuit, so the voltage of the point A is directly decreased by a threshold voltage (n·Vth, wherein n is the number of unidirectional conducting devices in the second threshold unit) which is a multiple of the number of the unidirectional conducting devices in the second threshold unit. As the voltage at the output of the rectifier circuit is changed, the voltage across the two ends of the antenna coil is changed, and thus, modulation depth of the passive radio-frequency tag chip is adjusted.

When the passive radio-frequency tag is in a weak field environment, voltage at the output of the rectifier circuit (also denoted as point A) is relatively low. Due to the threshold characteristics of the first threshold unit and the second threshold unit in the first modulation unit, the voltage of the point A cannot reach the sum of the threshold voltages Vth's of all unidirectional conducting devices in the first threshold unit and the second threshold unit, so the first modulation unit is in an off state with only extremely weak current flowing through. At this point, whether the second threshold unit is short-circuited or not hardly influences the voltage of the point A; that is to say, in the weak field environment, the first modulation unit cannot adjust the modulation depth of the passive radio-frequency tag. Also at this point, the second modulation unit is needed for modulation. The digital signal output end DATA controls the third N-type MOS transistor NM3 and the fifth N-type MOS transistor NM5 making them short-circuited. Meanwhile, the second enabling signal end enable2 controls the fourth N-type MOS transistor NM4 and the sixth N-type MOS transistor NM6 making them circuit-circuited, so that a path is formed respectively from the third resistor R3 and from the fourth resistor R4 to ground. Thus, voltage between the first antenna end ANTA1 and the second antenna end ANTB1 is pulled down, thereby adjusting modulation depth of the passive radio-frequency tag.

As described above, if merely using the first modulation unit, modulation cannot be carried out in a weak field, which makes the tag exhibit poor sensitivity in the weak field. On the contrary, if merely using the second modulation unit, in order to increase modulation depth in a strong field, the resistance values of the third resistor R3 and the fourth resistor R4 shall be small, but the second modulation unit with the small resistance values may lead to excessively low troughs under a weak field condition, and the energy collection requirement cannot be satisfied. On the other hand, if the resistance value of the pull-down resistor is large considering the energy collection problem under weak field condition, effect of pull-down of the tag under strong field condition may not be apparent, making modulation depth insufficient. That is, if merely using the second modulation unit, resistance value of the pull-down resistor for the load modulation cannot accommodate performance requirements under both of strong and weak field conditions. A tag of such performances is only sensitive in an either strong or weak field, and apparently, lacks market competitiveness. Therefore, the present invention adopts an alternate modulation approach by using the first modulation unit and the second modulation unit, so that the tag can perform self-adaptive modulation according to strength of RF field environment, to improve the overall performance of the tag.

A unidirectional conducting unit is further connected between the output of the rectifier circuit and the input of the load circuit, which is also the positive end of an energy-storage capacitor C1; the input end of the unidirectional conducting unit is connected to the output end of the rectifier circuit; the output end of the unidirectional conducting unit is connected to the input end of the load circuit and the positive end of the energy-storage capacitor C1. A first control end ctrl1 and a second control end ctrl2 of the unidirectional conducting unit are respectively connected to the output end of the unidirectional conducting unit, and such a structure enables a unidirectional conducting unit to be formed as a unidirectional conducting switch from the rectifier circuit to the load circuit and the energy-storage capacitor C1. Therefore, when the energy of the radio-frequency field is in the period of wave-crest, rectified current can be input to the load circuit and the energy-storage capacitor C1 through the unidirectional conducting unit as a power supply for the load circuit to work, and the energy-storage capacitor stores the charges; and when the energy of the radio-frequency field is in the period of wave-trough, oscillation amplitude on the antenna coil is smaller than the summed threshold voltage of all devices having the unidirectional conducting characteristics in the rectifier circuit (such as the sum of the threshold voltage of the diode D4 at a positive half cycle and the threshold voltage of the unidirectional conducting unit, or the sum of the threshold voltage of the diode D3 at the negative half cycle and the threshold voltage of the unidirectional conducting unit). At this moment, the energy collection stops, and the radio-frequency tag chip works only by virtue of the charges stored on the energy-storage capacitor C1. Also at this moment, the charges on the energy-storage capacitor C1 may flow to the load circuit as a power supply for the load circuit to work. However, since the unidirectional conducting unit is in a reversely biased off state, the charges cannot reversely flow to the rectifier circuit and the antenna coil's port, so that loss of the charges is avoided, and utilization rate of the energy-storage charges of the energy-storage capacitor C1 is increased, that is equivalently to say, the number of energy-storage capacitors to be used is reduced, and on the premise of keeping the chip cost as the same, a higher sensitivity of the passive radio-frequency tag at the far end (or under the weak field condition) can be realized, and the existing contradiction of design specification requirements between the cost and sensitivity of the passive radio-frequency tag can be solved.

FIG. 6 is a circuit diagram of a first embodiment of the unidirectional conducting unit of the present invention. In the present embodiment, the unidirectional conducting unit is a P-type MOS transistor PM1; the source end of the P-type MOS transistor PM1 is connected to the output end of the rectifier circuit as the input of the unidirectional conducting unit; the drain end of the P-type MOS transistor PM1 is connected to the input of the load circuit and the positive end of the energy-storage capacitor as the output of the unidirectional conducting unit; the gate end of the P-type MOS transistor PM1 is connected to the drain end of itself as a first control end ctrl1 of the unidirectional conducting unit; and finally as a key technical point of the present invention, the substrate end of the P-type MOS transistor PM1 is connected to the drain end of itself as a second control end ctrl2 of the unidirectional conducting unit.

A traditional connection method of the P-type MOS transistor in prior arts is that the substrate end of the P-type MOS transistor is connected to the highest level (i.e., the source end of the P-type MOS transistor), which is called reverse biased connection. This is because the substrate end of the PMOS transistor is an N-type doped N-well zone. In the CMOS manufacture process for highly integrated ICs, in order to avoid as much as possible irreversible latch-up triggered by positive feedback loop of parasitic current flowing from the substrate end to its surrounding NMOS transistors, the N-well substrate zone needs to be connected to the highest voltage so as to form a solid reversely biased diode, and risk of latch-up is eliminated. However, if reversely biased diode-connection is adopted for the substrate end of the P-type MOS transistor in the present patent, the voltage of the source end of the P-type MOS transistor may be decreased along with the decrease of the voltage of the antenna coil's port. If so, one end of the energy-storage capacitor C1 forms forward bias with respect to the source end of the P-type MOS transistor and the substrate end connected thereto, and the charges on the energy-storage capacitor may flow towards the antenna coil port in accordance with the forward bias, which leads to loss of the energy-storage charges. Such periodic loss of charges affects overall energy collection efficiency of the system. Therefore, a structure opposite to the traditional connection method is adopted in the present patent, so that leakage of the energy-storage charges during wave-trough periods can be avoided. Meanwhile, this technique will not cause latch-up concerned by traditional design practice for the following reasons.

Firstly, the working current of the passive radio-frequency tag is approximately of a micro-ampere ($10^{-6}$ amperes) and even nano-ampere ($10^{-9}$ amperes) order of magnitude. Current of such an order of magnitude actually can hardly trigger latch-up.

Secondly, physical layout design associated with the circuit design of this embodiment will intentionally add peripheral guard-rings and intentionally increase the distance between a device capable of generating the parasitic positive feedback loop and the P-type MOS transistor, so that a gain factor of the positive feedback loop can be effectively reduced, thus preventing the positive feedback loop from being triggered.

Figure 8:
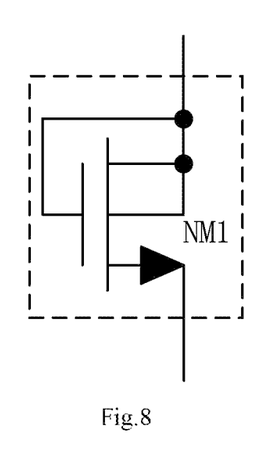
FIG. 8 is a circuit diagram of a second embodiment of a unidirectional conducting unit of the present invention.

FIG. 8 is a circuit diagram of a second embodiment of the unidirectional conducting unit of the present invention. In the present embodiment, the unidirectional conducting unit is an N-type MOS transistor NM1; and a drain end of the N-type MOS transistor NM1 is connected to the output of the rectifier circuit as the input of the unidirectional conducting unit; a source end of the N-type MOS transistor NM1 is connected to the input of the load circuit and the positive end of the energy-storage capacitor C1 as the output of the unidirectional conducting unit; a gate end of the N-type MOS transistor is connected to the drain end of itself as a first control end ctrl1 of the unidirectional conducting unit; and finally as a key technical point of the present invention, the substrate end of the N-type MOS transistor NM1 is connected to the drain end of itself as a second control end ctrl2 of the unidirectional conducting unit.

On the same principle, if the substrate end of the N-type MOS transistor NM1 is connected to the lowest level to avoid the latch-up according to the traditional connection method, during a wave-trough period, the positive end of the energy-storage capacitor C1 (i.e., the substrate end of the N-type MOS transistor NM1) may form forward bias to the antenna coil port, and the charges on the capacitor may flow towards the antenna coil port in accordance with the forward bias to cause loss of the energy-storage charges. Therefore, a structure opposite to the traditional connection method is adopted in the present invention to avoid leakage of the energy-storage charges during the wave-trough period, thereby increasing the utilization rate of the charges of the energy-storage capacitor, i.e., reducing the number of energy-storage capacitors to be used thereby realizing decrease of the chip cost.

Likewise, the switch devices adopted in the embodiments of the present invention such as the second N-type MOS transistor NM2 and the seventh N-type MOS transistor NM7 in the first modulation unit, and the third N-type MOS transistor NM3, the fourth N-type MOS transistor NM4, the fifth N-type MOS transistor NM5 and the sixth N-type MOS transistor in the second modulation unit can be replaced by P-type MOS transistors. Correspondingly, an opposite logic signal is used as the digital control signal or logic control signal at the gate end of each P-type MOS transistor.

Another objective of the embodiments of the present invention is to provide a passive radio-frequency tag consisting of the radio-frequency front-end circuit combining the functionality of rectification and load modulation. A first modulation unit is arranged at an output end of a rectifier circuit; a second modulation unit is arranged between a first and a second antenna coil end; the first and the second modulation unit change, by performing modulations, voltage at the output of the rectifier circuit and voltage across the two ends of antenna coil of a radio-frequency tag's transmitting end respectively under a strong and a weak field environment condition, thus adjusting modulation depth of the passive radio-frequency tag and making it easier for a receiving card reader to demodulate uplink data information transmitted by the passive radio-frequency tag, i.e., improving the sensitivity of the passive radio-frequency tag. Meanwhile, a unidirectional conducting unit connected between the output of the rectifier circuit and an input of a load circuit, which is also a positive end of an energy-storage capacitor, can input the rectified current to the load circuit and the energy-storage capacitor when the energy wave of the radio-frequency field experiences a wave-crest period so as to power the load circuit and to enable the energy-storage capacitor to store electric charges, and the energy-storage capacitor discharges when the energy wave of the radio-frequency field experiences a wave-trough period. Since the unidirectional conducting unit is in a strict reversely biased state, electric charges cannot reversely flow to the rectifier circuit and the antenna coil's port, so that loss of energy-storage charges is avoided, and the charges can only be input to the load circuit to power the load circuit, thereby increasing the utilization rate of the energy-storage charges of the energy-storage capacitor, and reducing the number of the energy-storage capacitors to be used, and reducing the area of the tag IC, and decreasing the cost of the tag IC. The present invention effectively solves existing contradiction of design specification requirements between cost and sensitivity of passive radio-frequency tags so as to meet the market demand on low cost and high performance.

Yet another objective of the embodiments of the present invention is to provide a radio-frequency front-end circuit combining functions of rectification and load modulation, which comprises: a rectifier circuit, wherein a first and a second input of the rectifier circuit is respectively connected to a first and second end of an antenna coil, an output of the rectifier circuit is connected to an input of a load circuit and a positive end of an energy-storage capacitor, and a negative end of the energy-storage capacitor is grounded, the radio-frequency front-end circuit being characterized in that: a unidirectional conducting unit is further connected to the output of the rectifier circuit, the input of the load circuit, and the positive end of the energy-storage capacitor; an input of the unidirectional conducting unit is connected to the output of the rectifier circuit; an output of the unidirectional conducting unit is connected to the input of the load circuit and the positive end of the energy-storage capacitor; and a first and a second control end of the unidirectional conducting unit are both connected to the output of the unidirectional conducting unit, thus forming a unidirectional path from the rectifier circuit to the load circuit and the energy-storage capacitor so as to prevent current from flowing back from the energy-storage capacitor to the rectifier circuit and the coil's port.

What is claimed is:

1. A radio-frequency front-end circuit of a radio-frequency tag combining functions of rectification and load modulation, comprising:
    a rectifier circuit, wherein a first and a second input of the rectifier circuit is respectively connected to a first and a second end of an antenna coil, and an output of the rectifier circuit is connected to an input of a load circuit and a positive end of an energy-storage capacitor, and a negative end of the energy-storage capacitor is grounded;
    the radio-frequency front-end circuit being characterized in that:
    a first modulation unit is connected between the output of the rectifier circuit and the ground;
    the first modulation unit is configured to, when the radio-frequency tag is in a strong field environment, change a voltage of the output of the rectifier circuit by utilizing data to be transmitted as a logic control signal to short-circuit or open-circuit a second threshold unit, so that the radio-frequency tag has a sufficient modulation depth, thereby making it easier for a receiving card reader to demodulate uplink data information transmitted by the radio-frequency tag;
    a second modulation unit is connected between the first and second end of the antenna coil;
    the second modulation unit is configured to, when the radio-frequency tag is in a weak field environment, change voltage across the two ends of the antenna coil of the transmitting radio-frequency tag by utilizing data to be transmitted as the logic control signal to connect or disconnect a pull-down resistor, so that the radio-frequency tag has a sufficient modulation depth, thereby making it easier for the receiving card reader to demodulate uplink data information transmitted by the radio-frequency tag; and
    a unidirectional conducting unit is further connected between the output of the rectifier circuit and an input of the load circuit, a positive end of the energy-storage capacitor;
    an input of the unidirectional conducting unit is connected to the output of the rectifier circuit;
    an output of the unidirectional conducting unit is connected to the input of the load circuit, the positive end of the energy-storage capacitor; and
    a first control end and a second control end of the unidirectional conducting unit are respectively connected to the output of the unidirectional conducting unit, thus forming a unidirectional path from the rectifier circuit to the load circuit and the energy-storage capacitor so as to prevent current of the energy-storage capacitor from flowing back to the rectifier circuit and the antenna coil's port.

2. The radio-frequency front-end circuit according to claim 1, wherein
    the first modulation unit comprises a first threshold unit, a second threshold unit, a second N-type MOS transistor and a seventh N-type MOS transistor connected in series; and
    an input of the first threshold unit is connected to the output of the rectifier circuit;
    an output of the first threshold unit is connected to an input of the second threshold unit;
    an output of the second threshold unit is connected to a drain end of the seventh N-type MOS transistor;
    a source end of the seventh N-type MOS transistor is grounded;
    a gate end of the seventh N-type MOS transistor is connected to a first enabling signal end;
    a drain end of the second N-type MOS transistor is connected to the input of the second threshold unit;
    a source end of the second N-type MOS transistor is connected to the output of the second threshold unit; and
    a gate end of the second N-type MOS transistor is connected to a digital signal output end.

3. The radio-frequency front-end circuit according to claim 2, wherein
    the first threshold unit is at least one diode, at least one P-type MOS transistor, or at least one N-type MOS transistor;
    a cathode end of any one of the at least one diode is connected to an anode end of an adjacent diode to form a serial structure;
    an anode end of a first diode in the serial structure is connected to the output of the rectifier circuit as the input of the first threshold unit;
    a cathode end of a last diode is connected to the input of the second threshold unit as the output of the first threshold unit;
    a drain end of any one of the at least one P-type MOS transistor is connected to a source end of an adjacent P-type MOS transistor to form a serial structure;
    a gate end of each P-type MOS transistor is connected to a drain end of the P-type MOS transistor;
    a source end of a first P-type MOS transistor in the serial structure is connected to the output of the rectifier circuit as the input of the first threshold unit;
    a drain end of a last P-type MOS transistor is connected to the input of the second threshold unit as the output of the first threshold unit;
    a source end of any one of the at least one N-type MOS transistor is connected to a drain end of an adjacent N-type MOS transistor to form a serial structure;
    a gate end of each N-type MOS transistor is connected to a drain end of the N-type MOS transistor;
    the drain end of a first N-type MOS transistor in the serial structure is connected to the output of the rectifier circuit as the input of the first threshold unit; and
    a source end of a last N-type MOS transistor is connected to the input of the second threshold unit as the output end of the first threshold unit.

4. The radio-frequency front-end circuit according to claim 2, wherein
    the second threshold unit is at least one diode, at least one P-type MOS transistor, or at least one N-type MOS transistor;

a cathode end of any one of the at least one diode is connected to an anode end of an adjacent diode to form a serial structure;

an anode end of a first diode in the serial structure is connected to the output of the first threshold unit as the input of the second threshold unit;

a cathode end of a last diode is connected to the drain end of the seventh N-type MOS transistor as the output of the second threshold unit;

a drain end of any one of the at least one P-type MOS transistor is connected to a source end of an adjacent P-type MOS transistor to form a serial structure;

a gate end of each P-type MOS transistor is connected to a drain end of the P-type MOS transistor;

a source end of a first P-type MOS transistor in the serial structure is connected to the output of the first threshold unit as the input of the second threshold unit;

a drain end of a last P-type MOS transistor is connected to the drain end of the seventh N-type MOS transistor as the output of the second threshold unit;

a source end of any one of the at least one N-type MOS transistor is connected to a drain end of an adjacent N-type MOS transistor to form a serial structure;

a gate end of each N-type MOS transistor is connected to a drain end of the N-type MOS transistor;

a drain end of a first N-type MOS transistor in the serial structure is connected to the output of the first threshold unit as the input of the second threshold unit; and a source end of a last N-type MOS transistor is connected to the drain end of the seventh N-type MOS transistor as the output of the second threshold unit.

5. The radio-frequency front-end circuit according to claim 1, wherein the second modulation unit comprises a third resistor, a fourth resistor, a third N-type MOS transistor, a fourth N-type MOS transistor, a fifth N-type MOS transistor and a sixth N-type MOS transistor;

an input of the third resistor is connected to the first end of the antenna coil;

the output of the third resistor is connected to a drain end of the third N-type MOS transistor;

a source end of the third N-type MOS transistor is connected to a drain end of the fourth N-type MOS transistor;

a source end of the fourth N-type MOS transistor is grounded;

a gate end of the third N-type MOS transistor is connected to a digital signal output end;

a gate end of the fourth N-type MOS transistor is connected to a second enabling signal end;

an input of the fourth resistor is connected to the second end of the antenna coil;

the output of the fourth resistor is connected to a drain end of the fifth N-type MOS transistor;

a source end of the fifth N-type MOS transistor is connected to a drain end of the sixth N-type MOS transistor;

a source end of the sixth N-type MOS transistor is grounded;

a gate end of the fifth N-type MOS transistor is connected to the digital signal output end; and a gate end of the sixth N-type MOS transistor is connected to the second enabling signal end.

6. The radio-frequency front-end circuit according to claim 1, wherein the unidirectional conducting unit is a P-type MOS transistor;

a source end of the P-type MOS transistor is connected to the output of the rectifier circuit as the input of the unidirectional conducting unit;

a drain end of the P-type MOS transistor is connected to the input of the load circuit and the positive end of the energy-storage capacitor as the output of the unidirectional conducting unit;

a gate end of the P-type MOS transistor is connected to the drain end of the P-type MOS transistor; and a substrate end of the P-type MOS transistor is connected to the drain end of the P-type MOS transistor.

7. The radio-frequency front-end circuit according to claim 1, wherein the unidirectional conducting unit is an N-type MOS transistor;

a drain end of the N-type MOS transistor is connected to the output of the rectifier circuit as the input of the unidirectional conducting unit;

a source end of the N-type MOS transistor is connected to the input of the load circuit and the positive end of the energy-storage capacitor as the output of the unidirectional conducting unit;

a gate end of the N-type MOS transistor is connected to the drain end of the N-type MOS transistor;

a substrate end of the N-type MOS transistor is connected to the drain end of the N-type MOS transistor.

8. A passive radio-frequency tag, comprising the radio-frequency front-end circuit combining functions of rectification and load modulation of claim 1.

9. A radio-frequency front-end circuit combining functions of rectification and load modulation, comprising:

a rectifier circuit, wherein a first and a second input of the rectifier circuit is respectively connected to a first and a second end of an antenna coil, an output of the rectifier circuit is connected to an input of a load circuit and a positive end of an energy-storage capacitor, and a negative end of the energy-storage capacitor is grounded;

a unidirectional conducting unit is further connected between the output of the rectifier circuit and the input of the load circuit, the positive end of the energy-storage capacitor;

an input of the unidirectional conducting unit is connected to the output of the rectifier circuit;

an output of the unidirectional conducting unit is connected to the input of the load circuit, the positive end of the energy-storage capacitor; and a first control end and a second control end of the unidirectional conducting unit are respectively connected to the output of the unidirectional conducting unit, thus forming a unidirectional path from the rectifier circuit to the load circuit and the energy-storage capacitor so as to prevent current of the energy-storage capacitor from flowing back to the rectifier circuit and the antenna coil's port.

* * * * *